US005668311A

United States Patent [19]

Kiess et al.

[11] Patent Number: 5,668,311

[45] Date of Patent: Sep. 16, 1997

[54] CYLINDER COMPRESSION DETECTION

[75] Inventors: Ronald J. Kiess, Decatur; Jeff Louis Courter, Freelandville, both of Ind.; Mark Albert Paul, Champaign, Ill.

[73] Assignee: General Motors Corporation, Detroit, Mich.

[21] Appl. No.: 646,855

[22] Filed: May 8, 1996

[51] Int. Cl.[6] .................... G01M 15/00

[52] U.S. Cl. .................... 73/116; 73/35.08; 324/379; 324/382; 324/402; 701/101

[58] Field of Search .................... 73/116, 117.2, 73/117.3, 118.1, 35.08; 364/431.03; 324/378, 379, 381, 382, 383, 402

[56] References Cited

U.S. PATENT DOCUMENTS

| | | | |
|---|---|---|---|
| 4,463,728 | 8/1984 | Bogden | 123/475 |
| 4,543,936 | 10/1985 | Gardner et al. | 123/475 |
| 4,601,193 | 7/1986 | Blauhut et al. | 73/116 |
| 4,795,979 | 1/1989 | Kreft et al. | 324/379 |
| 5,230,240 | 7/1993 | Ohsawa et al. | 73/116 |
| 5,272,914 | 12/1993 | Murata et al. | 73/116 |
| 5,410,253 | 4/1995 | Evans et al. | 324/391 |
| 5,461,316 | 10/1995 | Maruyama et al. | 324/402 |
| 5,493,496 | 2/1996 | James et al. | 324/402 |
| 5,528,928 | 6/1996 | Baker et al. | 73/116 |
| 5,548,220 | 8/1996 | Kawamoto et al. | 73/116 |

FOREIGN PATENT DOCUMENTS

| | | | |
|---|---|---|---|
| 4179859 | 6/1992 | Japan | 324/382 |
| 4191465 | 7/1992 | Japan | 324/382 |
| 4191467 | 7/1992 | Japan | 324/382 |
| 4191466 | 7/1992 | Japan | 324/382 |

*Primary Examiner*—Geprge M. Dombroske

*Attorney, Agent, or Firm*—Vincent A. Cichosz

[57] ABSTRACT

A compression detection apparatus for determining which one of a pair of phase-opposed cylinders is under compression has a capacitive probe coupled to both ends of the secondary winding of an ignition coil servicing both spark plugs of the pair of cylinders. Phase and magnitude of the voltage signal appearing on the capacitive probe line are processed by a single comparator for determining which on of the pair of cylinders is under compression.

7 Claims, 3 Drawing Sheets

CYLINDER COMPRESSION DETECTION

BACKGROUND

The present invention is related to spark-ignited internal combustion engine control and the coordination of fuel delivery and spark events in an internal combustion engine employing a distributorless ignition system and sequential fuel delivery system. More particularly, the invention is directed toward developing a signal indicative of absolute engine position in a sequentially fueled, distributorless ignition, internal combustion engine.

In sequentially fueled internal combustion engines, it is necessary to synchronize the fuel charge delivery with the combustion sequence of the engine such that fuel is delivered to an appropriate cylinder at and appropriate time (i.e. to the next cylinder undergoing compression). One manner of accomplishing this task is through the utilization of camshaft sensors which read the rotational position of a camshaft via interaction with a stationary sensing element, for example a variable reluctance or hall effect sensor. Camshaft sensorless methods and apparatus are also known which displace the requirement for this additional hardware by electronically sensing various characteristics of spark events within combustion cylinders and determining therefrom the absolute engine position for use in the synchronization of fueling. Such apparatus tend to be relatively complicated and may be sensitive to cross-talk from other combustion cylinder spark events or other sources of noise induced upon the ignition system.

One such example of a camshaft sensorless system is shown in U.S. Pat. No. 4,543,936 to Gardner et al. and assigned to General Motors Corporation. In that reference, an apparatus is shown having two voltage sense lines capacitively coupled to ends of the secondary winding of an ignition coil. Each end of the secondary winding supplies a respective spark plug in a respective one of a pair of combustion sequence phase-opposed cylinders. That is to say, one of the pair of cylinders reaches top dead center of its stroke in compression phase as the other of the pair of cylinders reaches top dead center of its stroke in exhaust phase. Generally, the spark plug disposed within the cylinder under compression will discharge at a higher voltage than the spark plug disposed within the cylinder under exhaust. The voltage sense lines are coupled to respective inputs of a comparator for differential processing after a predetermined time from initiation of a spark timing event for the cylinder pair. When the voltage on a predetermined one of the voltage sense lines exceeds the voltage on the other, a single sync pulse is generated by cooperation of the comparator and a monostable multivibrator. However, the opposite is not true and no sync pulse is generated when the voltage on the other voltage sense line exceeds the voltage on the predetermined one of the voltage sense line. Therefore, the apparatus provides a single sync pulse indicative of compression in only one of the pair of combustion phase-opposed cylinders.

Another example of such a system is shown in U.S. Pat. No. 5,410,253 to Evans et al., also assigned to General Motors Corporation. In this reference, an apparatus is shown wherein a single voltage sense line is capacitively coupled to both ends of the secondary winding of an ignition coil. The ignition coil again services a pair of spark plugs, each disposed within a respective cylinder of a combustion phase-opposed cylinder pair. Here, the single voltage sense line is branched to independent comparators for detecting voltage transients of a particular phase. The larger transient associated with the cylinder undergoing compression as well as the smaller transient associated with the cylinder undergoing exhaust are both detected. When the transients occur in a certain order and meet a very narrow timing separation constraint (e.g. 1.5 microseconds), a signal indicating compression in a predetermined one of the cylinders is generated. Again, the opposite is not true and compression detection is limited to only the predetermined one of the combustion sequence phase-opposed cylinders.

Therefore, it can be appreciated that the resolution of any such system is as limited as can be in that only one of the two cylinders in a combustion sequence phase-opposed pair is detected. Furthermore, the apparatus shown in Evans et al. is processing transient signals in a time frame positively correlated to undesirable electrical noise making it difficult to adequately attenuate the noise without degrading desirable performance of the apparatus.

SUMMARY

Therefore, the present invention provides for compression detection apparatus effective to detect compression in both of a pair of phase-opposed cylinders. Furthermore, the present invention advantageously avoids the shortfalls of time-based detection of substantially contemporaneous spark events.

In the present invention, a spark-ignited internal combustion engine having at least one pair of combustion cylinders operating in combustion sequence phase opposition has a distributorless ignition system. Such ignition system includes an ignition coil for providing phase opposed spark events across spark plugs disposed in each cylinder of the pair. The secondary winding of the ignition coil is capacitively probed at opposite ends to provide a transient voltage signal in response to a spark discharge of either of said spark plugs. The polarity of the voltage transient depends upon which spark plug discharged causing the voltage transient. The magnitude of the voltage transient depends upon whether the cylinder in which the spark event occurred was in compression or exhaust. The transient voltage signal is then evaluated in phase and magnitude by a comparator which outputs a first signal when the transient voltage signal is of a first phase and sufficient magnitude to indicate compression in the one of the pair of cylinders corresponding to the spark plug associated with the discharge which caused the transient voltage and outputs a second signal when the transient voltage signal is of a second phase and sufficient magnitude to indicate compression in the other one of the pair of cylinders corresponding to the spark plug associated with the discharge which caused the transient voltage.

BRIEF DESCRIPTION OF THE DRAWINGS

The present invention will now be described, by way of example, with reference to the accompanying drawings, in which.

DETAILED DESCRIPTION

Figure 1:
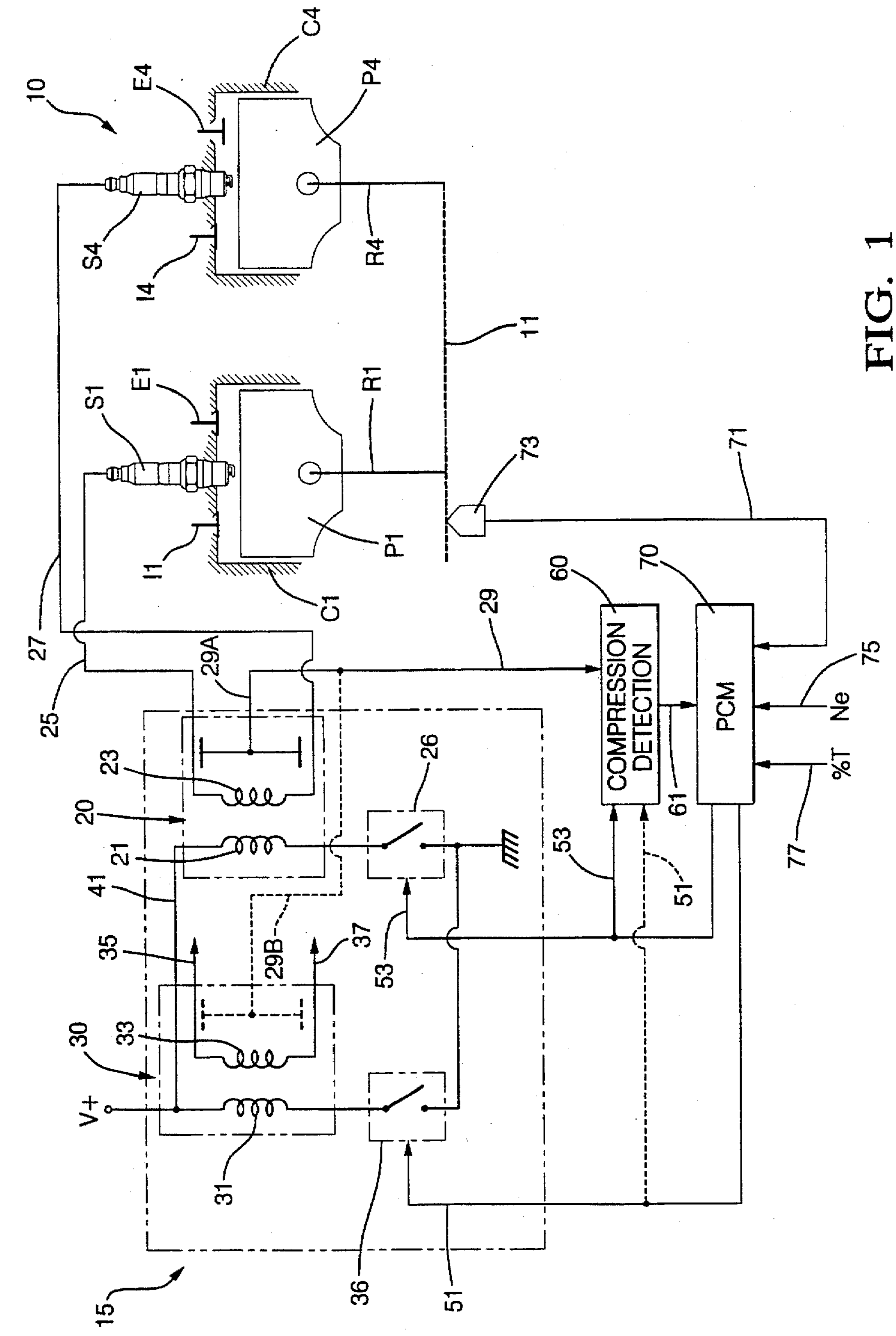
FIG. 1 is a block and schematic illustration of an apparatus in accord with the present invention.

With reference to the appended drawings and particularly with reference to FIG. 1, an exemplary internal combustion engine with sequential fuel injection and distributorless ignition system is illustrated. A four cylinder engine having two pairs of combustion sequence phase-opposed cylinders is used in the present example for ease of illustration; however, the invention may be practiced with engines having one or more pairs of combustion sequence phase-opposed cylinders.

In the exemplary four cylinder engine, only a first pair of combustion sequence phase-opposed cylinders (hereafter phase-opposed cylinders) is illustrated schematically .and generally labeled 10 in the figure. The engine, of course, has a second pair of phase-opposed cylinders referred to as C2 and C3 though not illustrated. The individual cylinders are labeled C1 and C4 and comprise, respectively, pistons P1 and P4 shown at top dead center. Cylinder C1 is illustrated in compression as can be seen from the closed state of intake and exhaust valves I1 and E1 respectively. Similarly, cylinder C4 is illustrated in exhaust or expansion as can be from the closed state of intake valve I4 and open state of exhaust valve E4. Each piston C1 and C4 is coupled to crankshaft 11 byway of respective connecting rods R1 and R4 to transfer piston reciprocation to crankshaft rotation and vice-versa. Also disposed within each cylinder is a respective spark plug S1 and S2 for igniting a flammable fuel charge therein. The preceding description substantially applies to the second pair of phase-opposed cylinders not illustrated; however, due to well known engine balance concerns the second pair generally will not have pistons at top dead center when the first cylinder pair pistons are at top dead center.

Fuel is delivered to individual cylinders in sequential fashion in accordance with the overall engine combustion sequence, for example C1, C3, C4, C2 in the exemplary four cylinder engine. Fuel delivery is accomplished by way of a sequential fuel injection system (not shown) which may comprise direct cylinder injection, multi-point intake runner injection, or single-point manifold-distributed injection. Regardless of the exact sequential fuel injection system, it is necessary to synchronize such fuel delivery with the combustion sequence of the engine cylinders.

Each phase-opposed pair of cylinders has associated with it a respective ignition coil generally labeled 20 and 30. Each ignition coil 20,30 is part of ignition module 15 for performing generation and distribution of high voltage ignition signals. Ignition coil 20 comprising primary winding 21 and secondary winding 23 services spark plugs S1 and S4 by providing each spark plug with voltage across respective spark plug gaps sufficient to result in a spark discharge in a well known manner. Spark plug S1 is coupled to one end of the secondary winding 23 via conductor 25 and spark plug S4 is similarly coupled to the other end of the secondary winding 23 via conductor 27. The spark plugs have respective center electrodes coupled to opposite ends of the secondary winding and respective ground electrodes commonly coupled to vehicle ground byway of the engine block in conventional fashion. Such arrangement results in spark events of opposite polarity in each of the respective cylinders. Likewise, ignition coil 30 comprises primary winding 31 and secondary winding 33 in similar fashion to provide each associated spark plug with voltage across respective spark plug gaps sufficient to result in a spark discharge. Though not separately illustrated, the spark plugs associated with the second pair of phase-opposed cylinders are connected to the secondary winding 33 via lines 35 and 37 in analogous fashion resulting in spark events of opposite polarity in each of the respective cylinders.

Each ignition coil 20,30 has its respective primary winding 21,31 coupled to system voltage V+, approximately twelve volts in a conventional automotive application, as illustrated. Respective low side drivers 36,26 such as conventional darlington paired transistors are controlled in response to spark timing signals on lines 51,53 respectively. Closing a respective low side driver energizes the associated primary winding with increasing current therethrough. Interrupting the current therethrough by opening the low side driver causes a collapse in the magnetic field established by the primary winding and induces a voltage across the secondary winding which also appears across the electrodes of the associated spark plugs. When the breakdown voltage of a spark plug is reached, a current discharge occurs across the gap causing a spark event in the corresponding cylinder.

Powertrain Control Module (PCM) 70 receives various sensor inputs including a throttle position signal %T on line 77 such as from conventional potentiometer, an engine speed signal Ne on line 75 such as from a cooperative toothed wheel and variable reluctance sensor, and engine crankshaft position on line 71 such as from a toothed encoder wheel and variable reluctance sensor 73. These input quantities and others provide data to the PCM for controlling engine and transmission functions including developing appropriate electronic spark timing (EST) signals in a manner generally well known to those skilled in the art.

PCM 70 communicates EST signals, generally digital pulses, by way of lines 51,53 to ignition module 15. Furthermore, lines 51,53 are shown coupled to compression detection circuit 60, line 51 appearing as a broken line to indicate its inclusion as supplemental to that of line 53 where higher resolution in the cyclic detection of cylinder compression is desired. While being illustrated as generating separate EST signals on separate lines 51,53, it is equally well known to provide a single EST pulse line containing appropriate EST timing signals for distribution by additional hardware (not shown) within the ignition module. Such arrangement will also generally be characterized by redundant or passed through crankshaft position data to the additional hardware of the ignition module as appropriate. Where, as mentioned, ignition module 15 receives a single EST pulse line, that line will be supplied to compression detection circuit 60 also.

Finally with respect to FIG. 1, sense line 29A is shown capacitively coupled to both ends of the secondary winding 23 of ignition coil 20. Such coupling is generally understood to include conventional conductive material such as conductors running parallel respective conductive leads from opposite ends of the secondary coil 23. Line 29A therefore provides a composite voltage signal in accordance with the charge states of the conductors in proximity to the respective secondary winding leads. Line 29A continues as line 29 to be input to compression detection circuit 60. Additionally, the other ignition coil(s) may likewise be probed as shown by broken line 29B capacitively coupled similarly to secondary winding 33 of ignition coil 30. Such arrangement would be desired where higher resolution in the cyclic detection of cylinder compression is desired.

Figure 3A:
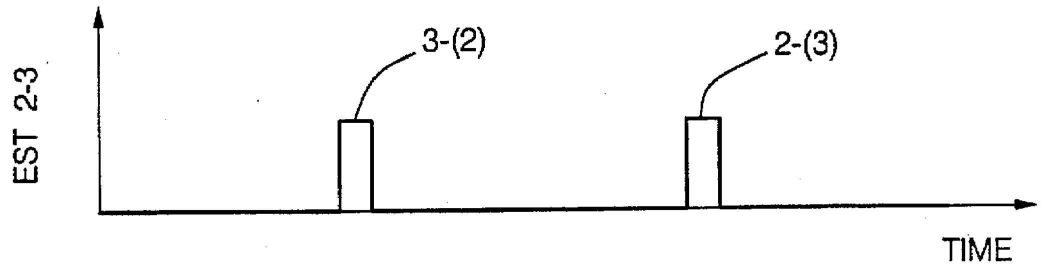
FIGS. 3A–3D are various time based charts illustrating quantities and signals in accord with various embodiments of the invention as illustrated in the circuit of FIG. 2.
Figure 3B:
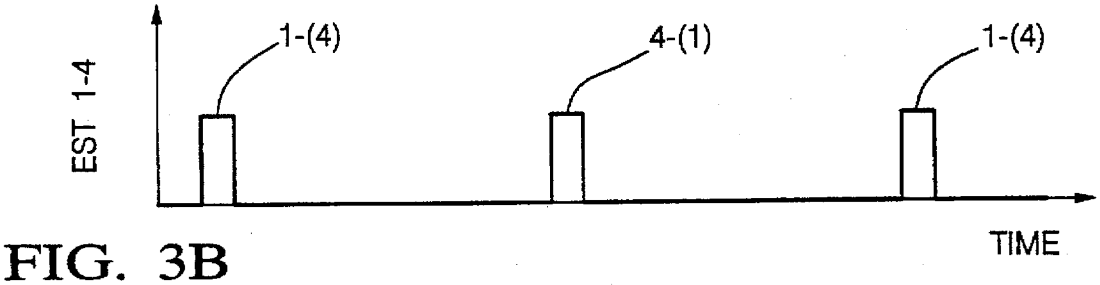

A four cylinder internal combustion engine has a combustion sequence such as illustrated through the EST pulse representations of FIGS. 3A and 3B. FIG. 3A corresponds to EST pulse line 51 of FIG. 1 and therefore is labeled $EST_{2-3}$, the subscript designating the cylinders serviced by the ignition. coil 30 controlled by the EST line 51. Similarly, FIG. 3B, labeled $EST_{1-4}$, corresponds to EST pulse line 53 of FIG. 1 and services ignition coil 20 controlled by the EST line 53. Representation of a single EST pulse line would essentially be a combination of the two individual EST pulse representations of FIGS. 3A and 3B. In operation, the engine systems are coordinated to deliver fuel charge and spark in the cylinder combustion sequence C1, C3, C4, C2. Of course, in a distributorless ignition system wherein a single ignition coil services a pair of cylinders, such as coil 20 and cylinder C1 and C4, each EST pulse provides a spark event in each cylinder. Thus, the first EST pulse in FIG. 3B labeled "1-(4)" represents a spark event in each cylinder C1 and C4 where cylinder C1 is in compression and cylinder C4 is in exhaust. Likewise, the next sequential EST pulse in FIG. 3B labeled "4-(1)" represents a spark event in each cylinder C1 and C4; however, in this case cylinder C1 is in exhaust and cylinder C4 is in compression. Similarly labeled EST pulses in FIG. 3A correspond to spark events in cylinders C2 and C3. In both FIGS. 3A and 3B the EST pulse labeling convention is such that the second number in parenthesis corresponds to the similarly numbered cylinder exhausting while the first number not in parenthesis corresponds to the similarly numbered cylinder compressing.

Figure 3C:
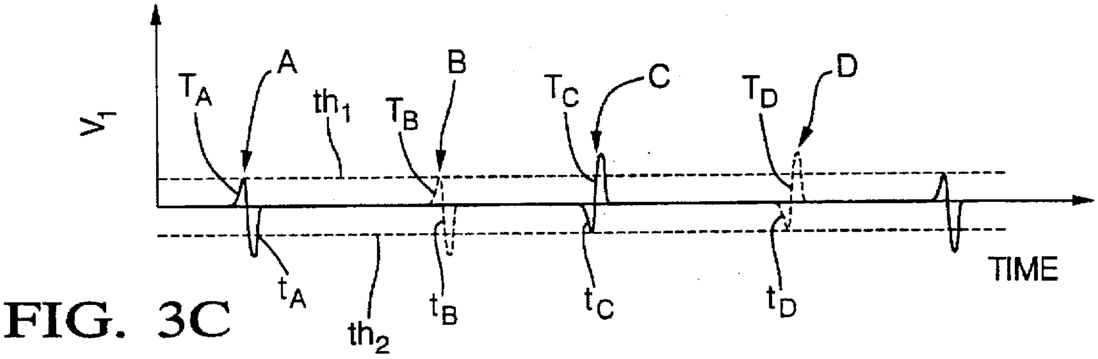

FIG. 3C represents the composite voltage signal $V_1$ appearing on line 29 which represents phase and magnitude of each spark event in each one of the cylinders for all phase-opposed cylinder pairs having respective ignition coils capacitively coupled to line 29. Various portions of the trace in FIG. 3C are generally labeled A–D and correspond to spark events in respective phase-opposed pairs of combustion cylinders. More specifically, portions A and C correspond to spark events in cylinders C1 and C4 while portions B and D correspond to spark events in cylinders C2 and C3. It is further noted that portions B and D are illustrated in broken lines such that it is understood that they correspond to supplementary signals appearing on line 29 only if secondary winding 33 of ignition coil 30 is capacitively probed by supplemental line 29B as previously described in furtherance of the objective of higher resolution in the cyclic detection of cylinder compression where desired.

Each set of spark events A–D comprise positive going transients and negative going transients. For example, spark events A have labeled the positive going transient $T_A$ and the negative going transient $t_A$. Other spark events are similarly labeled with capital T designating the respective positive going transient, lower case t designating the respective negative going transient, and the subscript corresponding to the respective spark events. Therefore, the composite signal phase, that is to say its positive or negative going transient, is cylinder identifying.

With reference to spark events A and C corresponding to cylinders C1 and C4, it is noted that in the arrangement described a spark event in cylinder C1 will appear as a negative going transient t while a spark event in cylinder C4 will appear as a positive going transient T due to the polarity of the spark plug electrodes with respect to the secondary winding 23 of ignition coil 20. It is further noted that the lesser magnitude event—$T_A$ for spark events A and $t_C$ for spark events C—corresponds to the spark event in the exhausting cylinder, while the greater magnitude event—$t_A$ for spark events A and $T_C$ for spark events C—corresponds to the spark event in the compressing cylinder. The same relationship holds true for supplementary spark events B and D. It is generally recognized that that a spark event in a cylinder in exhaust occurs at a lower voltage across the electrodes of the spark plug than does a spark event in a cylinder in compression. Therefore, the composite signal magnitude, that is to say the absolute value of a transient, is cylinder combustion phase identifying (i.e. compression or exhaust).

Additionally, simultaneous and substantially equivalent increases in electrode gap voltages such as is the case with a distributorless ignition system as described will therefore generally result in the spark event in the cylinder exhausting to precede the spark event in the cylinder compressing. This relationship, too, is born out by examination of FIG. 3C wherein each spark events A–D show the lesser magnitude transient occurring prior to the greater magnitude transient. It is recognized, however, that under low manifold absolute pressure conditions, such as closed throttle decelerations, the spark event in the cylinder compressing may precede the spark event in the cylinder exhausting. In such situations, the transient amplitudes of both the exhaust and compression cylinder spark events are of relatively small magnitude.

In accordance with the present invention, spark events in one or more phase-opposed pairs of cylinders are interrogated such as by capacitively probing opposite ends of secondary windings of respective ignition coils to provide a composite signal. Magnitude and phase information contained in the composite signal are processed such that each set of spark events in a phase-opposed pair of cylinders results in a signal conveying data regarding which one of the pair of cylinders is under compression thereby providing absolute engine position data at a maximum within a single crankshaft rotation or, put another way, within one-half of a combustion cycle. The effective resolution is thereby doubled over conventional compression detection methodologies which detect compression in only one of a pair of phase-opposed cylinders. In an alternative embodiment of the invention wherein spark events for all cylinders are so processed, the resolution is again increased such that absolute engine position is known within one-half crankshaft rotation or one-quarter of a combustion cycle. Extending application of the present invention beyond four cylinder engines and to multi-cylinder engines having an even number of cylinders wherein spark events for all cylinders are processed results in resolutions yielding absolute engine position within 2/(# of cylinders) of a crankshaft rotation or 1/(# of cylinders) of a combustion cycle.

Figure 2:
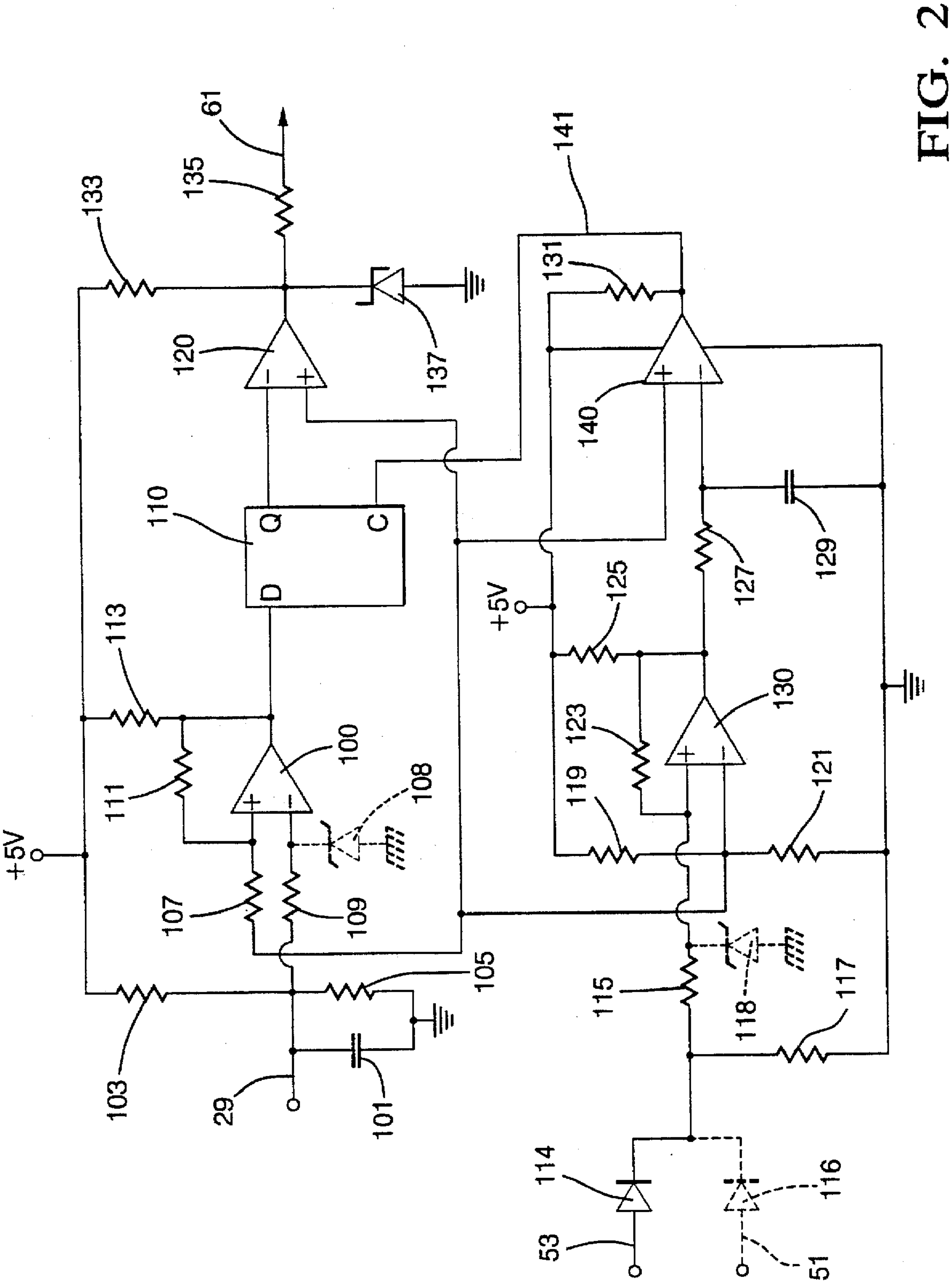
FIG. 2 is a circuit diagram of an embodiment of the present invention.

With reference now to FIG. 2, a schematic circuit of a preferred embodiment of the compression detection circuit block 60 in FIG. 1 is detailed. Line 29 from FIG. 1 is connected to similarly labeled line 29 in FIG. 4 and provides the composite voltage signal of from the capacitive sense probe(s) to the circuit. 68 pF capacitor 101 located between the sense line 29 input and ground in conjunction with the capacitive characteristics of the sense probe(s) divides down the input voltage signal to the inverting input of comparator 100 through 27 Kilo-ohm resistor 109 to a maximum of approximately 10 volts peak to peak. Also commonly coupled to the sense line 29 are a pair of 100 kilo-ohm resistors 103 and 105 further coupled to a five volt supply and ground, respectively. The sense line voltage is thereby biased to an approximate 2.5 volt offset. Also shown coupled between the inverting input and ground is zener diode 108. Such diode is commonly known to be included to limit transients at the input to the comparator and prevent damage thereto. It is illustrated, however, in broken line format since some comparators internalize such protective measures and external protection may be superfluous.

The non-inverting input to comparator 100 is commonly coupled to a pair of 100 kilo-ohm resistors 107 and 11. Resistor 111 is seen to be coupled at the other end to the output of comparator 100. The output of comparator 100 is also coupled to the 5 volt supply through a 2 kilo-ohm pull-up resistor 113. The other end of resistor 107 is coupled to the node between a pair of 10 kilo-ohm resistors 119,121 forming a voltage divider between the 5 volt supply and ground. This node is further coupled to the inverting input of comparator 130.

Comparator 100 is the type having an output comprising the collector of a grounded emitter transistor. Therefore, the output is generally either at ground (low) due to the inverted input being at a higher voltage than the non-inverting input, or at 5 volts through pull-up resistor 113 due to the inverting input being at a lower voltage than the non-inverting input. A high output from comparator 100 results in a voltage of substantially 3.8 volts at the non-inverting input thereof while a low output from comparator 100 results in a voltage of substantially 1.2 volts. With the output of the comparator high, a voltage at the inverting input in excess of 3.8 volts will cause the output of the comparator 100 to toggle low thereby setting the inverting input voltage to 1.2 volts. Likewise, with the output of the comparator low, a voltage at the inverting input in less than 1.2 volts will cause the output of the comparator 100 to toggle high thereby setting the inverting input voltage to 3.8 volts.

Figure 3D:
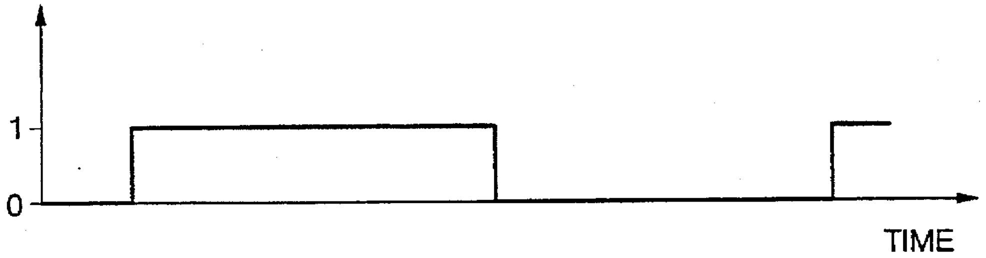

With reference to FIG. 3C, the horizontal dashed lines labeled $th_1$ and $th_2$ correspond, respectively, to the 3.8 volt and 1.2 volt thresholds described above. It is therefore understood that it is preferable to scale the composite signal voltage through appropriate selection of capacitor 101 such that the negative going transients in an exhausting cylinder (e.g. $t_C$) will not cross the threshold $th_2$ corresponding to 1.2 volts in the exemplary embodiment yet also such that the negative going transients in a compressing cylinder (e.g. $T_A$) will cross the threshold $th_2$. Similarly, it is preferable to scale the composite signal voltage such that the positive going transients in an exhausting cylinder (e.g. $T_A$) will not cross the threshold $th_1$ corresponding to 3.8 volts in the exemplary embodiment, yet also such that the positive going transients in a compressing cylinder (e.g. $T_C$) will cross the threshold $th_1$. FIG. 3D on one hand represents the output state of the comparator 100 in response to a composite signal on line 29 as shown in the solid trace of FIG. 3D for the spark events of phase-opposed cylinder pair C1 and C4.

Therefore, a negative going transient of sufficient magnitude will set the comparator 100 output to logical one (5 volts) where it remains until a positive going transient of sufficient magnitude resets the comparator 100 output to a logical zero (ground). In normal operation, the compression related transients (e.g. $t_A$, $T_C$) are preceded by the exhaust related transients (e.g. $T_A$, $t_C$). Therefore, in the event that an exhaust related transient is of sufficient magnitude to cross the corresponding threshold and toggle the comparator 100 output, such is immediately followed by the compression related transient which will toggle the output of the comparator 100 back to the desired state for cylinder compression indication.

The output of comparator 100 is coupled to the data input terminal 'D' of a clocked latch 110 in the present embodiment. The latch is used to capture the output state of the comparator 100 at a predetermined time subsequent the desired monitored spark events. This ensures integrity of the data from one measured spark event to the next irrespective of noise or crosstalk from other spark events and also provides a clean edge output in contrast to the output achievable directly from comparator 100. The latch 110 in the present embodiment is positive edge triggered at clock input 'C' and provides a non-inverted output state Q.

The clock signal on line 141 is generated a predetermined time from the falling edge of the EST pulse corresponding to the phase-opposed cylinder pair of interest. EST line 53 corresponding to EST signals for controlling ignition coil 20 is coupled through blocking diode 114 and 10 kilo-ohm resistor 115 to the non-inverting input of comparator 130. Coupled between the anode of diode 114 and ground is 100 kilo-ohm resistor 117, the purposes of which are discussed below. As previously described, the inverting input of comparator 130 is coupled to the node between resistors 119 and 121. The voltage at the node is substantially stable around 2.5 volts, varying from approximately 2.4 volts when the output of comparator 100 is low and 2.6 volts when the output of comparator 100 is high. The output of comparator 130 is coupled in feedback to the non-inverting input thereof through a one mega-ohm resistor 123 and is also couple to 5 volts through 1.5 kilo-ohm pull-up resistor 125. Resistor 123 provides for a degree of hysteresis to reduce sensitivity of comparator 130 to noise as may be commonly found on EST lines. The output of the comparator 130 follows the input at the non-inverting input. Therefore, when the EST signal on line 53 goes high or low, so too does the output of comparator 130. A high EST state on line 53 provides a high output from comparator 130 while a low EST state on line 53 provides a low output from comparator 130.

As an alternative consistent with the previously described embodiment where higher resolution is desirous, EST line 51 similarly may be coupled through blocking diode 116 to the non-inverting input of comparator 130 when supplemental line 29B is coupled to sense line 29.

In the embodiment having a single EST line coupled through line 53 to the non-inverting input of comparator 130, inclusion of diode 114 is optional. The blocking functions of diodes 114 and 116 are complementary. That is to say diode 114 blocks voltages from EST signals on line 51 from being fed back to line 53 and diode 116 prevents voltages from EST signals on line 53 from being fed back to line 51. Resistor 117 provides a relatively low impedance path to bleed off charge across the diode(s) junction capacitance(s). It may also provide for a diagnostic value suitable for polling should it be desirable for the powertrain control module to interrogate the compression detection circuit to determine integrity of the interconection thereto.

Comparator 140 has its non-inverting input coupled to the same voltage as the inverting input of comparator 130 to thereby also be set to approximately 2.5 volts. The output of comparator 130 is coupled to the inverting input of comparator 140 through RC delay network comprising 100 kilo-ohm resistor 127 and 1000 pF capacitor 129. The output of comparator 140 is coupled to 5 volts through 1.5 kilo-ohm pull-up resistor 131 and to the clock input 'C' of data latch 110. The output of comparator 140 is therefore seen to inversely follow the output of comparator 130 with a delay in accordance with the RC time constant of resistor 127 and capacitor 129. In the present embodiment, the delay is substantially 69 μS. Therefore, at approximately 69 μS after the falling edge of an EST pulse, the output state of the Comparator 100 is clocked to the output 'Q' of data latch 110.

Also shown is comparator 120 having its non-inverted input coupled to substantially 2.5 volts and the inverting input coupled to the output of data latch 110. The output of comparator 120 is coupled to 5 volts through a 470 ohm resistor 133 and to one end of a 470 ohm resistor 135. Additionally, zener diode 137 is coupled between the comparator 120 output and ground to protect the circuitry from transients induced upon on the output line 61 The output line 61 therefore provides an inverted signal relative to the data latch 110 output 'Q'. The comparator 120, resistors 133, 135 and diode 137 provide for a low output impedance and appropriate phase of the output signal through inversion as may typically be required of the interfacing electronics such as powertrain control module 70.

We claim:

1. An engine cylinder compression detection apparatus for a spark-ignited internal combustion engine having a pair of combustion cylinders operating in combustion sequence phase opposition and a distributorless ignition system including an ignition coil for providing phase opposed spark events across sparking means disposed in respective ones of said pair of combustion cylinders, comprising:

sensing means for providing a composite signal representing polarity and magnitude of spark events in said pair of combustion cylinders; and, detection means responsive to said composite signal for providing a first diagnostic signal when said composite signal indicates a first relationship between polarity and magnitude of spark events and a second diagnostic signal when said composite signal indicates a second relationship between polarity and magnitude of spark events, wherein one of said first and second diagnostic signals indicates compression in one of said pair of combustion cylinders and the other of said first and second diagnostic signals indicates compression in the other one of said pair of combustion cylinders.

2. An engine cylinder compression detection apparatus as claimed in claim 1 wherein said ignition coil includes a secondary winding and said sensing means comprises a conductor capacitively coupled to opposite ends of said secondary winding.

3. An engine cylinder compression detection apparatus as claimed in claim 1 wherein said detection means comprises comparator means characterized by a hysteresis band effective to allow said comparator to change from a first output state to a second output state corresponding respectively to said first and second diagnostic signals only when said composite signal has a first polarity and is outside of said hysteresis band and from the second output state to the first output state, only when said composite signal has a second polarity and is outside of said hysteresis band.

4. The engine cylinder compression detection apparatus as claimed in claim 1 further comprising capture means effective to sample and hold the respective one of the first and second diagnostic signals provided by said detection means following spark events.

5. An engine cylinder compression detection apparatus for a spark-ignited internal combustion engine having a plurality of combustion sequence phase-opposed pairs of combustion cylinders, and a distributorless ignition system including a respective ignition coil for each one of said plurality of combustion sequence phase-opposed pairs of combustion cylinders for providing phase opposed spark events across sparking means disposed in the respective combustion sequence phase-opposed pair of combustion cylinders, comprising:

sensing means for providing a composite signal representing polarity and magnitude of respective phase opposed spark events in each of said plurality of combustion sequence phase-opposed pairs of combustion cylinders; and, detection means responsive to said composite signal for providing a first diagnostic signal when said composite signal indicates a first polarity and magnitude relationship of phase opposed spark events across sparking means disposed in the respective combustion sequence phase-opposed pair of combustion cylinders and a second diagnostic signal when said composite signal indicates a second polarity and magnitude relationship of phase opposed spark events across sparking means disposed in the respective combustion sequence phase-opposed pair of combustion cylinders, wherein one of said first and second diagnostic signals indicates compression in one of the combustion cylinders of the respective combustion sequence phase-opposed cylinder pair and the other of said first and second diagnostic signals indicates compression in the other one of the combustion cylinders of the respective combustion sequence phase-opposed cylinder pair.

6. An engine cylinder compression detection apparatus for a spark-ignited internal combustion engine having a pair of combustion cylinders operating in combustion sequence phase opposition and a distributorless ignition system, comprising:

an ignition coil including primary and secondary windings, the secondary winding having a first end coupled by a first conductor to a first spark plug disposed in one or said pair of cylinders and a second end coupled by a second conductor to a second spark plug disposed in the other of said pair of cylinders;

a sense line capacitively coupled to the first and second conductors for producing a transient voltage signal in response to a spark discharge of either of said spark plugs characterized by a first polarity when the first spark plug discharges and a second polarity when the second park plug discharges, said transient voltage signal further characterized by a first magnitude less than a predetermined magnitude if the one of said pair of cylinders corresponding to the one of the first and second spark plugs discharging is exhausting and a second magnitude greater than the predetermined magnitude if the one of said pair of cylinders corresponding to the one of the first and second spark plugs discharging is compressing; and bi-stable detection means coupled to said sense line for establishing a first output state only when said transient voltage signal of said first polarity is characterized by said second magnitude and a second output state only when said transient voltage signal of said second polarity is characterized by said second magnitude.

7. An engine cylinder compression detection apparatus as claimed in claim 6 wherein said bi-stable detection means comprises comparator means characterized by a hysteresis band wherein limits for the hysteresis band correspond to said second magnitude.

* * * * *